(12) United States Patent
Zhang

(10) Patent No.: US 12,448,174 B2
(45) Date of Patent: Oct. 21, 2025

(54) FOLDABLE STORAGE BOX

(71) Applicant: Taizhou Huangyan Bicheer Technology Co., Ltd., Taizhou (CN)

(72) Inventor: Jue Zhang, Taizhou (CN)

(73) Assignee: Taizhou Huangyan Bicheer Technology Col, Ltd, Taizhou (CN)

( * ) Notice: Subject to any disclaimer, the term of this patent is extended or adjusted under 35 U.S.C. 154(b) by 0 days.

(21) Appl. No.: 18/648,710

(22) Filed: Apr. 29, 2024

(65) Prior Publication Data

US 2025/0026536 A1 Jan. 23, 2025

(30) Foreign Application Priority Data

Jul. 17, 2023 (CN) .......................... 2023-21876444.2

(51) Int. Cl.
*B65D 6/18* (2006.01)
*B65D 21/08* (2006.01)

(52) U.S. Cl.
CPC .................................. *B65D 21/086* (2013.01)

(58) Field of Classification Search
CPC .............. B65D 11/1833; B65D 11/186; B65D 11/1853; B65D 11/1846; B65D 11/18; B65D 1/225; B65D 21/086; B65D 21/37; B60R 7/02

USPC .......................... 224/925, 542, 42.34; 220/6
See application file for complete search history.

(56) References Cited

U.S. PATENT DOCUMENTS

| | | | |
|---|---|---|---|
| 2004/0140334 A1* | 7/2004 | Drane | B60R 7/02 224/542 |
| 2005/0199624 A1* | 9/2005 | Wang | B65D 9/10 220/6 |
| 2020/0165030 A1* | 5/2020 | Song | B65D 25/24 |
| 2021/0316901 A1* | 10/2021 | Song | B65D 25/20 |

* cited by examiner

*Primary Examiner* — King M Chu
(74) *Attorney, Agent, or Firm* — Scherrer Patent & Trademark Law, P.C.; Stephen T. Scherrer; Monique A. Morneault

(57) ABSTRACT

A foldable storage box includes a box frame. The box frame and a bottom wall panel clamped at a bottom of the box frame form a storage space. The side walls of the box frame are provided with a plurality of fold hinges to fold the box frame. The bottom of the box frame is integrally formed with several support straps. The support straps are arranged on the outside of the bottom wall panel, and the support straps are engaged or mated with the bottom wall panel.

8 Claims, 7 Drawing Sheets

FOLDABLE STORAGE BOX

The present invention claims priority to CN220221555U, filed Jul. 17, 2023, titled "A Foldable Storage Box," which is incorporated herein by reference in its entirety.

TECHNICAL FIELD

The utility model relates to the technical field of storage boxes, and in particular to a foldable storage box.

BACKGROUND

Storage boxes are containers used to store, organize, and protect items. They usually have a closed structure, which can place items in an orderly manner, and the needed items can be easily taken out. The design and function of the storage box vary according to the purpose, and can be used in homes, offices, schools, factories, etc. Storage boxes can also be distinguished based on their shape, material and characteristics. Some common storage box types include plastic boxes, paper boxes, fabric boxes, metal boxes, etc. They can have different sizes, colors and organization methods to accommodate different types of items and space needs;

Typically, foldable storage boxes are not strong enough to effectively hold items therein and are prone to deformation, which affects the normal uses of the storage boxes. For this reason, we propose a foldable storage box to solve the above problems.

SUMMARY OF THE INVENTION

The purpose of this utility model is to solve the problems existing in the prior art and propose a foldable storage box. The present utility model adopts the following technical solutions:

A foldable storage box includes a box frame. The box frame and a bottom wall panel integrated at the bottom of the box frame form a storage space. A plurality of strips are provided on the side walls of the box frame for folding the box frame. There is a frame gap, and the bottom of the box frame is integrally formed with several supporting straps. The supporting straps are arranged on the outside of the bottom wall panel, and the supporting straps are clamped with the bottom wall plate.

Preferably, a folding hinge is provided in the middle of the support belt, a plurality of first hinges are provided on both sides of the folding hinge, and a plurality of second hinges are provided on the back of the folding hinge. A third hinge is provided at the connection point between the support belt and the box frame.

Preferably, the bottom surface of the bottom wall panel is provided with a plurality of intersecting bottom reinforcement strips and the bottom reinforcement strips are provided with strip grooves that match the support straps.

Preferably, foot assemblies are provided at four corners below the bottom wall panel. The foot assemblies include a mounting base and a sliding device provided at the bottom of the mounting base. Mounting cavities are provided at the four corners of the bottom of the bottom wall panel. Symmetrical connection holes are provided at the four corners of the bottom of the box frame. Fixed posts that match the connection holes are symmetrically provided above the mounting base. Positioning posts that match the side walls of the installation cavity are provided at the upper end of the mounting base.

Preferably, the bottom edge of the box frame is provided with a plurality of limit plates, the bottom of the bottom wall plate is provided with a plurality of bottom card slots matching the limit plates, and a plurality of limit cards are provided above the limit plates. buckle, the limit buckle is set on the top of the bottom wall plate, a plurality of positioning buckles are provided at the bottom of the bottom wall plate, and a plurality of positioning grooves matching the positioning buckles are provided at the bottom of the box frame.

Preferably, the box frame is provided with a strip groove. In an embodiment, the present invention is as follows:

1. By arranging the supporting strap integrated with the box frame, the strength and stability of the storage box are enhanced. Even if the storage box is made into a larger storage box, the bottom wall panel can still be firmly installed and will not fall off during use or be deformed, rendering the storage box unusable;
2. Through the structure of the supporting strap and the installation with the bottom wall panel, the support strap is easy to fold and is installed solidly;
3. By setting foot assemblies with floor sliding devices at the four corners below the bottom wall panel, the floor sliding devices allow the storage box to slide freely, making it more convenient to use;
4. Install by matching the box limiting plates with bottom wall slots, and then set the bottom wall panel through the top of the box frame, limiting the bottom panel downward above the limiting plates, and install it through the positioning buckle and the positioning groove. The positioning groove is located above the positioning buckle, so that the bottom wall plate is firmly connected to the bottom of the box frame. Two sets of reversely set limit devices ensure that the bottom wall plate and the box frame are firmly installed;
5. When not in use, remove the bottom wall panel, fold the box frame inward or outward along the frame gap, and fold the support strap inward or outward along the folding groove and the third groove, making the box frame larger in size. Shrink to save storage space.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The technical solutions in the embodiments of the present utility model will be clearly and completely described below with reference to the accompanying drawings in the embodiments of the present utility model. Obviously, the described embodiments are only part of the embodiments of the present utility model, not all implementations. example.

Figure 1:
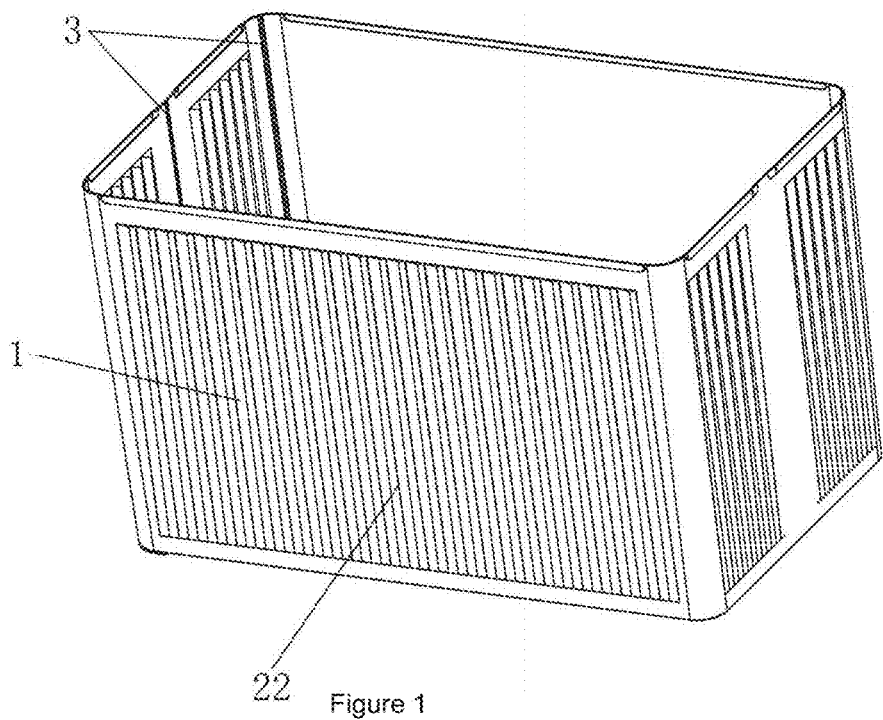
FIG. 1 is a schematic structural diagram of a foldable storage box proposed by the utility model.
Figure 2:
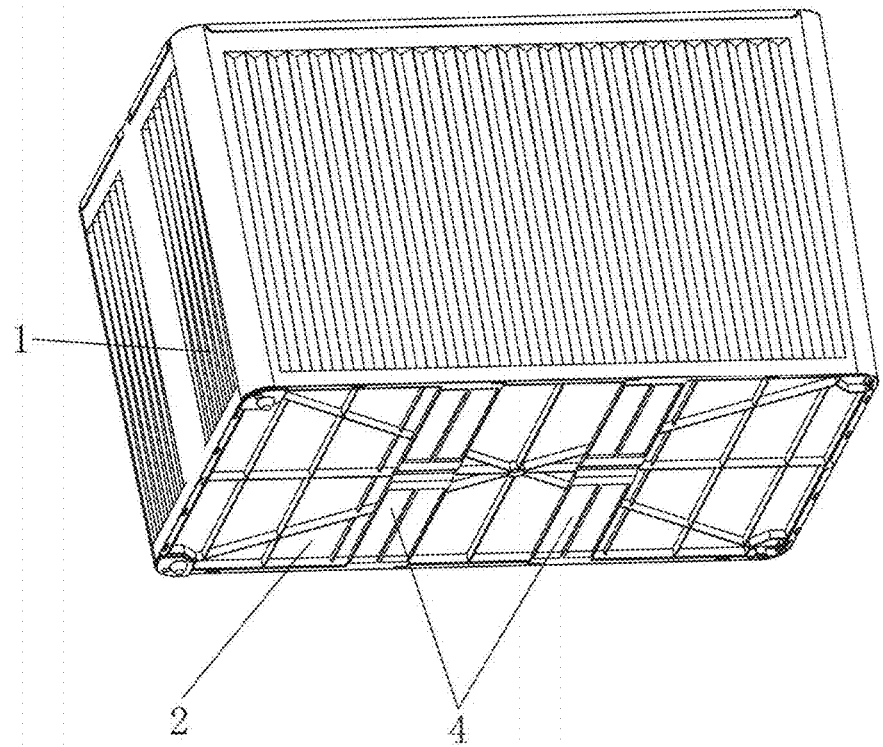
FIG. 2 is a schematic structural diagram of a foldable storage box with double supports and a storage box from above proposed by the utility model.
Figure 3:
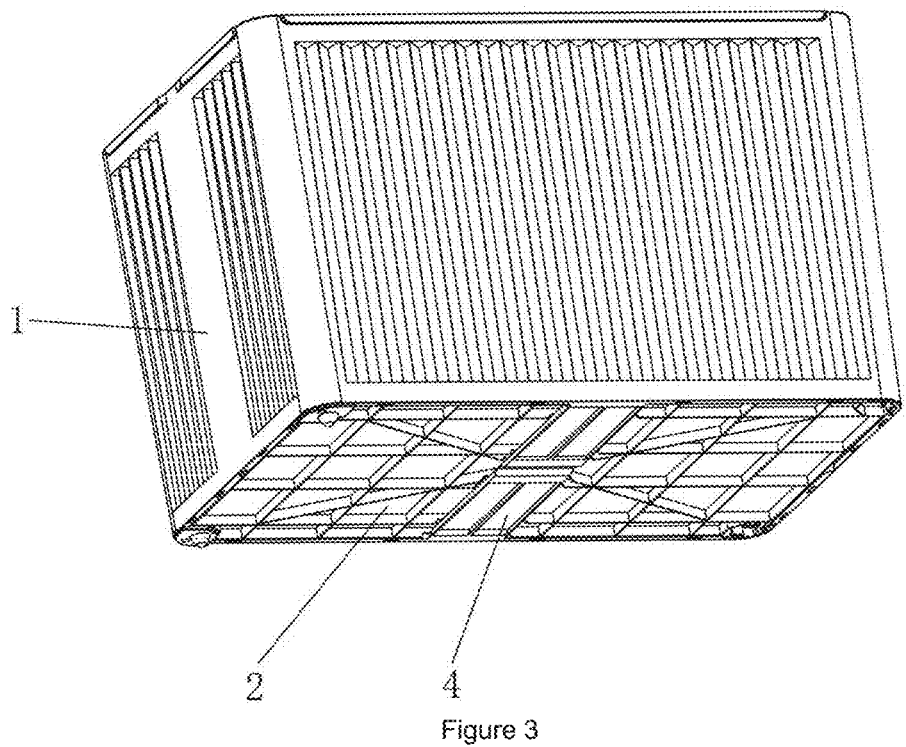
FIG. 3 is a schematic structural diagram of a single-support storage box with a foldable storage box proposed by the utility model, viewed from above.
Figure 4:
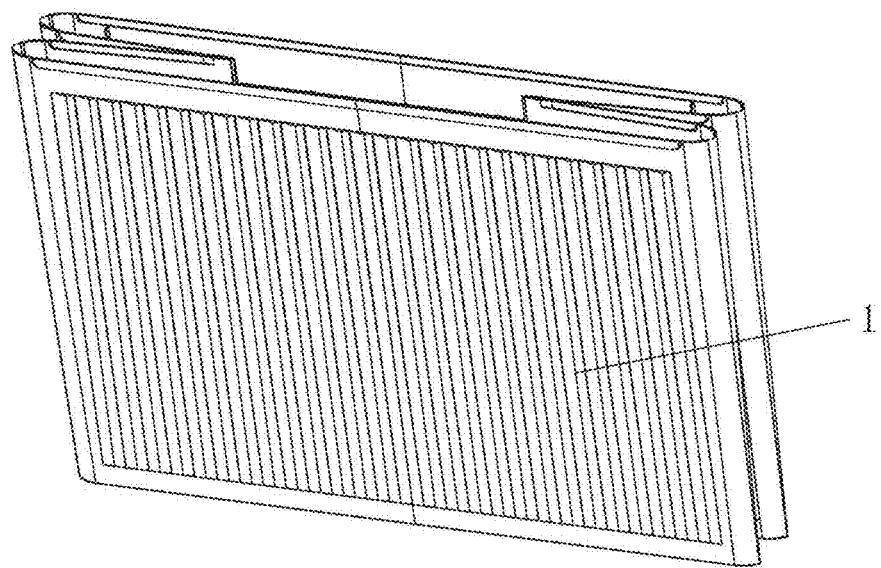
FIG. 4 is a schematic structural diagram of the folded state of the box frame of a foldable storage box proposed by the present utility model.
Figure 5:
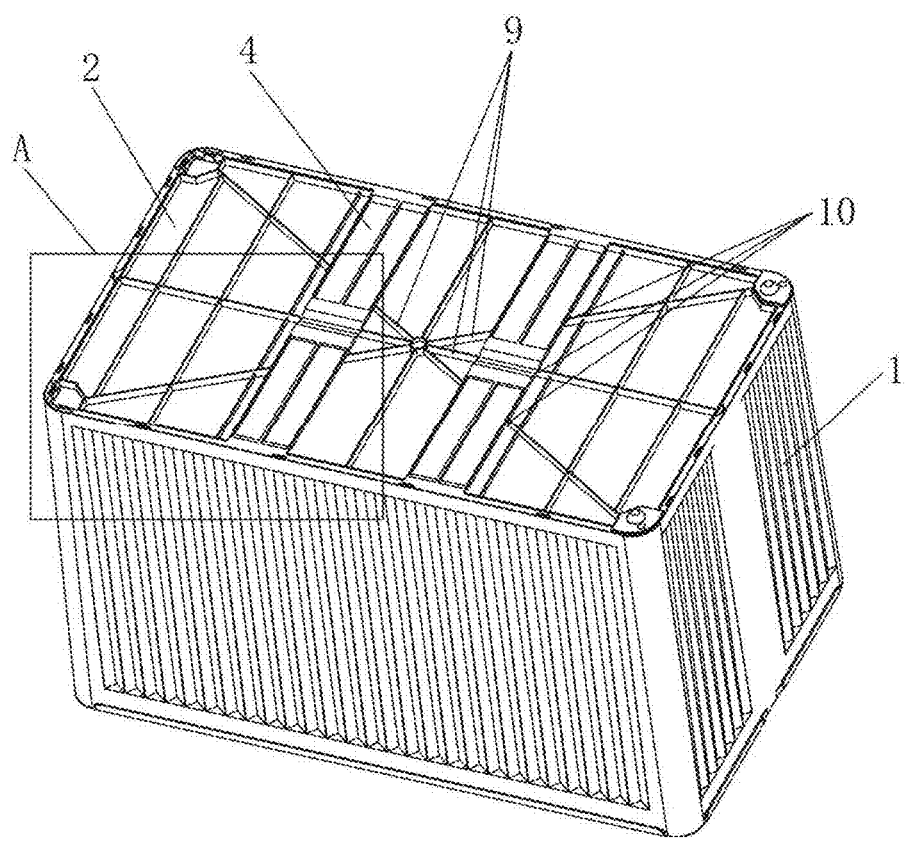
FIG. 5 is a schematic diagram of the assembly of the support strap and the bottom wall panel of a foldable storage box proposed by the present utility model.
Figure 6:
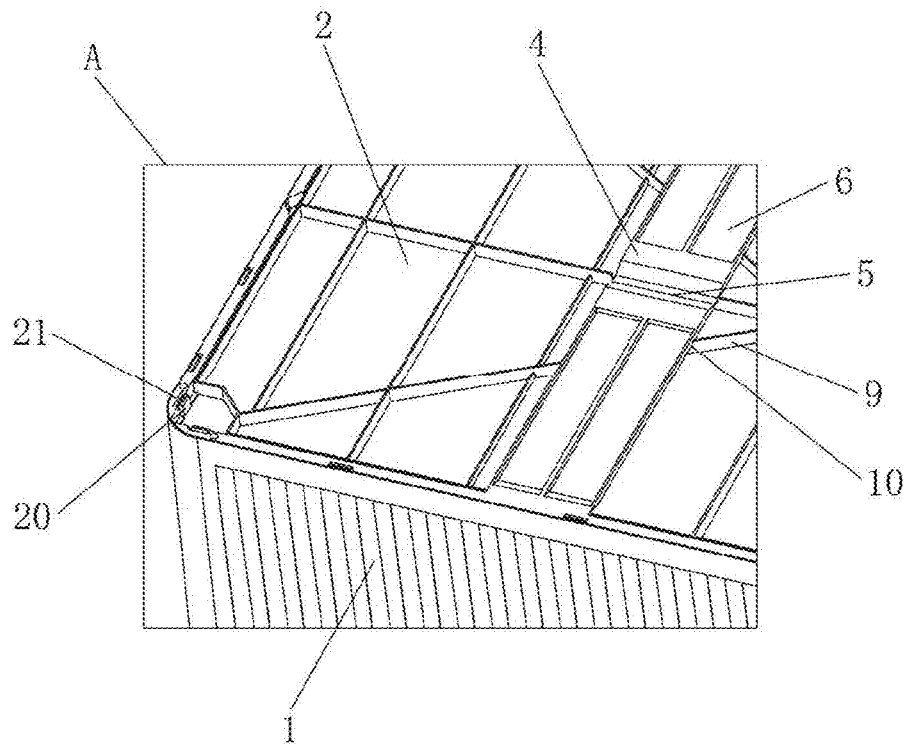
FIG. 6 is a schematic structural diagram of position A in FIG. 5.
Figure 7:
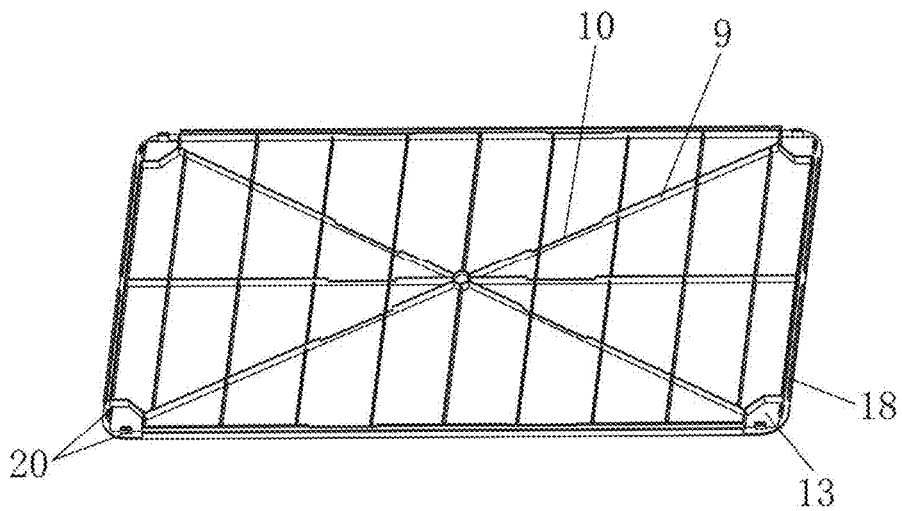
FIG. 7 is a schematic diagram of the bottom structure of the bottom wall panel of a foldable storage box proposed by the utility model.
Figure 8:
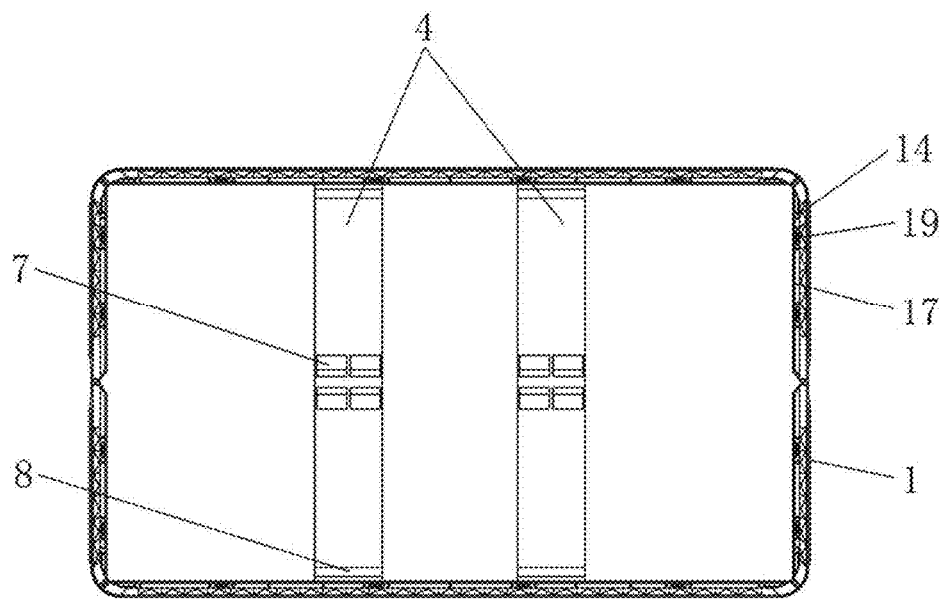
FIG. 8 is a schematic structural view from above of the box frame of a foldable storage box proposed by the present utility model.
Figure 9:
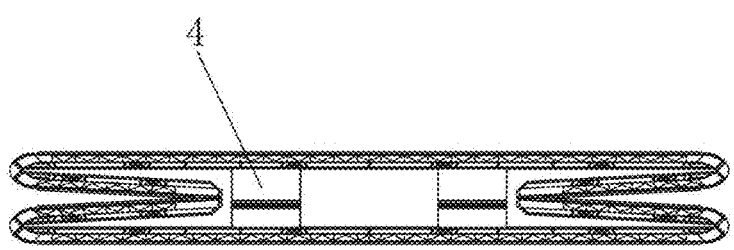
FIG. 9 is a schematic structural diagram of the folded state of the support strap of a foldable storage box proposed by the present invention.
Figure 10:
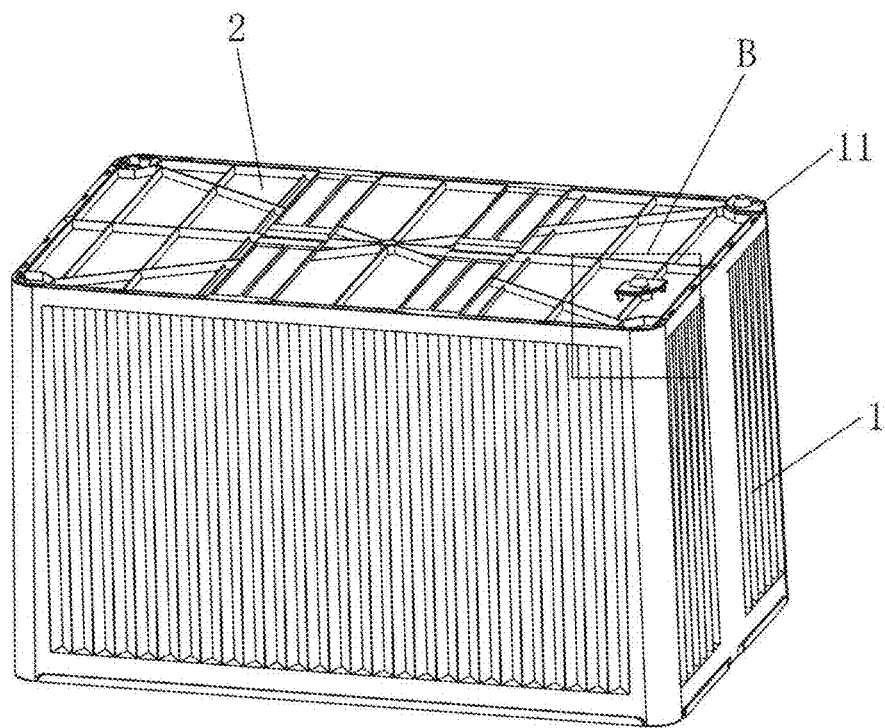
FIG. 10 is a schematic diagram of the disassembled structure of the leg assembly of a foldable storage box proposed by the present invention.
Figure 11:
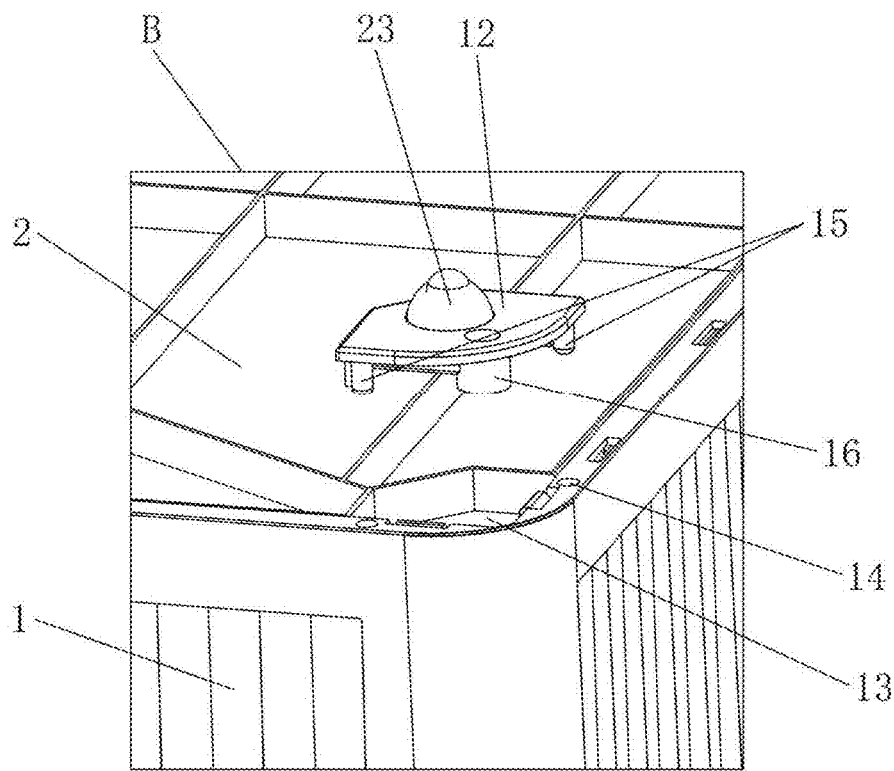
FIG. 11 is a schematic structural diagram of position B in FIG. 10.
Figure 12:
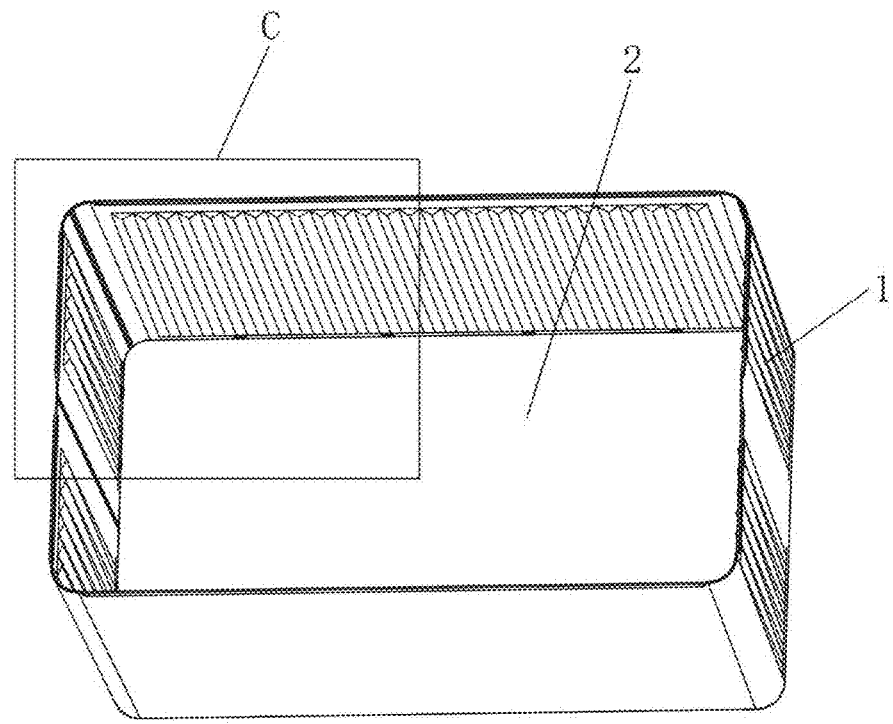
FIG. 12 is a schematic diagram of the assembly of the box frame and bottom wall panel of a foldable storage box proposed by the present utility model.
Figure 13:
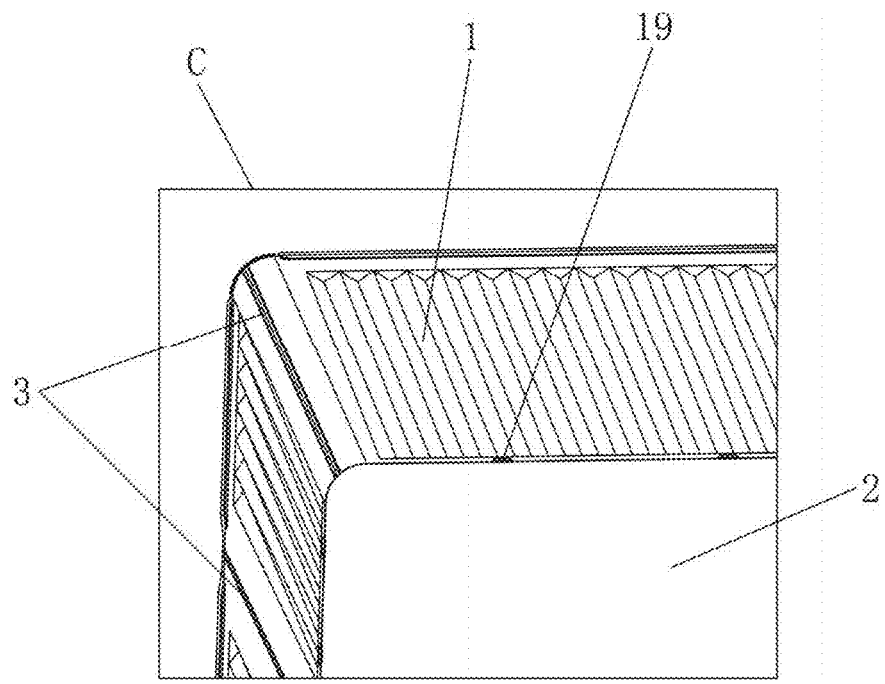
FIG. 13 is a schematic structural diagram of C in FIG. 12.

Referring to FIGS. 1-13, a foldable storage box includes a box frame 1. The box frame 1 is surrounded by a bottom wall panel 2 clamped at the bottom of the box frame 1 to form a storage space. The side walls of the box frame 1 are provided with multiple frame grooves or hinges 3 for folding the box frame 1. The bottom of the box frame 1 is integrally formed with several supporting straps 4. The supporting straps 4 are arranged on the outside of the bottom wall panel 2, and the supporting straps 4 are engaged with the bottom wall panel 2. By arranging the supporting strap 4 integrated with the box frame 1, the strength and stability of the storage box are enhanced. Even if it is made into a larger storage box, the bottom wall panel 2 can still be firmly installed and will not fall off or deform during use, causing the storage box to be unusable. A folding groove or hinge 5 is provided in the middle of the support belt 4, a plurality of first grooves 6 are provided on both sides of the folding groove or hinge 5, and a plurality of second grooves 7 are provided on the back of the folding groove 5. A third folding groove or hinge 8 is provided at the connection between the support belt 4 and the box frame 1, through the arrangement of the folding groove or hinge 5 and the third folding groove or hinge 8.

The support strap 4 is conveniently folded at the folding groove or hinge 5 and the third folding groove or hinge 8. By setting the first grooves 6 and the second grooves 7 on opposite sides, the strength of the support strap 4 is enhanced and the weight of the support strap 4 is reduced, so that the strength of the storage box is increased at the same time, so as not to be too bulky. A plurality of intersecting bottom reinforcement strips 9 are provided on the bottom surface of the bottom wall panel 2. The bottom reinforcement strips 9 are provided with strip grooves 10 that match the support straps 4. Through the strip grooves 10 and the support strips 4, cooperation makes the installation of the support strap 4 more secure and will not cause the bottom wall panel 2 to fall off or deform during use, causing the storage box to become unusable.

Foot assemblies 11 are provided at the four corners below the bottom wall panel 2. The foot components 11 include a mounting base 12 and a sliding device 23 provided at the bottom of the mounting base 12. A mounting cavity 13 is provided at the four corners at the bottom of the bottom wall panel 2, symmetrical connection holes 14 are provided at the four corners of the bottom of the box frame 1, fixing columns 15 matching the connection holes 14 are symmetrically provided above the mounting base 12 and the mounting cavity 13 is provided at the upper end side of the mounting base 12. The positioning posts 16 matched with the side walls are installed through the connection holes 14 and the fixing posts 15. The installation cavity 13 is installed with the positioning posts 16 so that the foot components 11 are firmly installed at the four corners below the bottom wall plate 2. The sliding device 23 allows the storage box to slide freely on a floor, making it more convenient to use.

The bottom edge of the box frame 1 is provided with multiple limit plates 17, and the bottom of the bottom wall panel 2 is provided with multiple bottom slots 18 that match the limit plates 17, a plurality of limit buckles 19 are provided above the limit plates 17, the limit buckles 19 are arranged on the top of the bottom wall panel 2. A plurality of positioning buckles 20 are provided at the bottom of the bottom wall plate 2, and a plurality of positioning buckle slots 21 are provided at the bottom of the box frame 1. The positioning buckle slots 21 matching the positioning buckles 20 are installed by matching the limit plates 17 with the bottom slots 18, and then is set on the top of the bottom wall plate 2 through the limit buckles 19. The bottom slots 18 are limited above the limit plate 17 and are installed with the positioning buckles 20 and the positioning buckle slots 21 so that the bottom wall plate 2 is firmly connected to the bottom of the box frame 1. The box frame 1 is provided with a jagged or corrugated wall 22 to increase the strength of the box frame 1 and make the storage box more beautiful.

In the utility model, when in use, the bottom wall plate 2 is clamped at the bottom of the box frame 1 to form a storage space, and the limit plates 17 are matched with the bottom slots 18 for installation, and then the limit buckles 19 are used to set the storage space. On the top of the bottom wall panel 2, the bottom slots 18 are limited or positioned above the limit plate 17, and the positioning buckles 20 are installed into the positioning slots 21, so that the bottom wall panel 2 is firmly clamped on the bottom of the box frame 1, to keep the box frame 1 in an open state, and at the same time, the several support straps 4 are integrally formed at the bottom of the box frame 1. Through the support straps 4 arranged on the outside of the bottom wall panel 2 and snap-fitted with the bottom wall panel 2, the storage box has enhanced strength. Even if it is made into a larger storage box, the bottom wall panel 2 can still be firmly installed and will not fall off or deform during use, rendering the storage box unusable.

The foot assemblies 11 with sliding devices 23 can also be installed at the four corners below the bottom wall plate 2 and installed in conjunction with the fixing posts 15 through the connecting holes 14 and the installation cavity 13 in conjunction with the positioning posts 16 so that the foot assemblies 11 can be firmly installed on the four corners below the bottom wall panel 2, the sliding devices 23 allow the storage box to slide freely, making it more convenient to use.

When the device is not in use, the storage box may be folded. For folding, the bottom wall panel 2 is removed, the box frame 1 is folded inward or outward along the frame groove hinge 3, and the support strap(s) 4 is/are folded inward or outward along the folding groove or hinge 5 and the third groove or hinge 8. The box frame 1 is greatly reduced in size, saving storage space.

The above is only a preferred specific implementation method of the utility model, but the protection scope of the utility model is not limited to this. Any technician familiar with the technical field within the technical scope disclosed by the utility model, according to the technical solution and utility model concept of the utility model, shall be covered by the protection scope of the utility model.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A foldable storage box comprising:
   a box frame, characterized in that the box frame and a bottom wall panel clamped at a bottom of the box frame form a storage space,
   wherein a side wall of the box frame is provided with a plurality of frame hinges for folding the box frame, and the bottom of the box frame is integrally formed with a supporting strap,
   wherein the supporting strap is arranged outside the bottom wall panel, and the supporting strap is mated with the bottom wall panel;
   a middle strap folding hinge in a middle of the supporting strap;
   a first end strap folding hinge provided on a first end of the supporting strap connecting the support strap to the box frame;
   a second end strap folding hinge provided on a second end of the supporting strap connecting the support strap to the box frame
   a plurality of second grooves on the back of the strap folding hinge; and
   a third groove at the connection between the support strap and the box frame.

2. The foldable storage box according to claim 1, characterized in that a plurality of intersecting bottom reinforcement strips are provided on a bottom surface of the bottom wall panel and each of the bottom reinforcement straps have a strip groove matching at least one of the supporting straps.

3. The foldable storage box according to claim 1, characterized in that foot assemblies are provided at four corners below the bottom wall panel, and the foot assemblies include mounting bases, and a sliding device provided at the bottom of each mounting base,
   wherein the bottom wall panel is provided with installation cavities at the four corners of the bottom wall panel, and the box frame is provided with, at the four corners at the bottom thereof, symmetrical connection holes at the four corners, wherein a fixing post matching the connection hole is symmetrically provided above the mounting base, and a mounting cavity is provided on the upper end side of the mounting base, the positioning post matched with the side wall.

4. The foldable storage box according to claim 1, characterized in that a plurality of limiting plates are provided at the bottom edge of the box frame, and a plurality of limiting slots are provided at the bottom of the bottom wall panel;
   bottom slots matching the limiting plates;
   a plurality of limiting buckles are provided above the limiting plates, the limiting buckles clamped on the bottom wall,
   wherein a plurality of positioning buckles are provided at the bottom of the bottom wall panel, and a plurality of positioning grooves matching the positioning buckles are provided at the bottom of the box frame.

5. The foldable storage box according to claim 1, characterized in that the box frame comprises a jagged or corrugated side wall.

6. A foldable storage box comprising:
   a box frame, characterized in that the box frame and a bottom wall panel clamped at a bottom of the box frame form a storage space,
   wherein a side wall of the box frame is provided with a plurality of frame hinges for folding the box frame, and the bottom of the box frame is integrally formed with a supporting strap,
   wherein the supporting strap is arranged outside the bottom wall panel, and the supporting strap is mated with the bottom wall panel;
   a plurality of intersecting bottom reinforcement strips on a bottom surface of the bottom wall panel; and
   a strip groove matching the supporting strap on one of the bottom reinforcement straps.

7. A foldable storage box comprising:
   a box frame, characterized in that the box frame and a bottom wall panel clamped at a bottom of the box frame form a storage space,
   wherein a side wall of the box frame is provided with a plurality of frame hinges for folding the box frame, and the bottom of the box frame is integrally formed with a supporting strap,
   wherein the supporting strap is arranged outside the bottom wall panel, and the supporting strap is mated with the bottom wall panel; and
   a foot assembly at each of the four corners below the bottom wall panel, each foot assembly including a mounting base and a sliding device provided at the bottom of each mounting base;
   an installation cavity at each of the four corners of the bottom wall panel;
   a symmetrical connection hole at each of the four corners at the bottom of the box frame;
   a fixing post matching each of the connection holes symmetrically provided above the mounting base; and
   a mounting cavity on the upper end side of each mounting base,
   wherein the positioning posts are matched with the side wall.

8. A foldable storage box comprising:
   a box frame, characterized in that the box frame and a bottom wall panel clamped at a bottom of the box frame form a storage space,
   wherein a side wall of the box frame is provided with a plurality of frame hinges for folding the box frame, and the bottom of the box frame is integrally formed with a supporting strap,
   wherein the supporting strap is arranged outside the bottom wall panel, and the supporting strap is mated with the bottom wall panel;
   a plurality of limiting plates at the bottom edge of the box frame;
   a plurality of limiting slots at the bottom of the bottom wall panel, the limiting slots at the bottom of the wall panel matching the limiting plates;

a plurality of limiting buckles above the limiting plates, the limiting buckles clamped on the bottom wall,
a plurality of positioning buckles at the bottom of the bottom wall panel; and
a plurality of positioning grooves matching the positioning buckles at the bottom of the box frame.

* * * * *